United States Patent [19]

Kameyama et al.

[11] Patent Number: 5,217,727
[45] Date of Patent: Jun. 8, 1993

[54] APPARATUS FOR PLACING A MOLD

[75] Inventors: Masahiro Kameyama; Tsutomu Shirakawa, both of Kobe, Japan

[73] Assignee: Kabushiki Kaisha Kosmek, Hyogo, Japan

[21] Appl. No.: 855,869

[22] Filed: Mar. 23, 1992

[30] Foreign Application Priority Data

Mar. 29, 1991 [JP] Japan .................. 3-28779[U]

[51] Int. Cl.⁵ .............................. B29C 45/10
[52] U.S. Cl. .................. 425/185; 425/190; 425/574; 425/575
[58] Field of Search ........... 425/182, 185, 190, 192 R, 425/514, 575

[56] References Cited

U.S. PATENT DOCUMENTS 5,063,648 11/1991 Yonezawa et al. ............. 425/190

FOREIGN PATENT DOCUMENTS 61-47611 3/1986 Japan .

Primary Examiner—Tim Heitbrink
Attorney, Agent, or Firm—Bacon & Thomas

[57] ABSTRACT

An operated member (17) fixed to a mold plate (14) is adapted to be pushed and pulled in the left and right direction by way of a push/pull hook (31) of a mold replacing carriage (3). When a mold (13) on the carriage (3) is moved onto a mold placing stand (6), the mold plate (14) is brought out to a predetermined position on the stand (6) by way of the hook (31) and after that the leftward and rightward movements of the operated member (17) is prevented by way of the left and right stoppers (41) (42). The first stopper (41) on the left side is retracted below a mold supporting surface (S) at the time of passing of the mold (13). The second stopper (42) on the right side is disposed at such a position as allowing the mold (13) and the mold plate (14) to pass thereby.

6 Claims, 9 Drawing Sheets

APPARATUS FOR PLACING A MOLD

BACKGROUND OF THE INVENTION

1. Field of the Invention

This invention relates to an apparatus for placing a mold, and more particularly to an apparatus adapted to be used for a carriage type mold replacing system and provided with a mold placing stand for temporarily supporting a mold to be replaced between a molding machine such as an injection molding machine and a mold replacing carriage.

2. Description of Prior Art

Such a carriage type mold replacing system is disclosed in Japanese Provisional Utility Model Publication No. 61-47611. In this system, a push/pull hook is adapted to engage with a metal mold (referred to merely as a mold hereinafter) placed on a mold supporting surface of a mold replacing carriage from above so that the mold can be brought to and from an injection molding machine by driving the engaged hook in the fore and back direction.

Further, as a mold placing apparatus relating to the present invention have been known first through third conventional embodiments shown in FIGS. 12(A) through 14 respectively. These conventional embodiments have following basic constructions.

A mold placing stand 106 is provided at its upper portion with a mold supporting surface S extending in the fore and back direction (in the left and right direction in FIGS. 12(A)–14. The same shall apply hereinafter). Mold plates 114 (only one is shown herein) fixedly secured to a pair of opposed sides of a mold 113 have a downward projecting portion 114a so placed on the mold supporting surface S as to be movable in the fore and back direction. A mold push/pull driven portion 118 and a mold advancement preventing stopped portion 119 are secured to the front portion (the left portion in FIGS. 12(A)-13 ) of the mold plate 114. The driven portion 118 can be pushed and pulled in the fore and back direction by means of a push/pull hook (not illustrated) of a mold replacing carriage disposed in front of the mold placing stand 106. Further, according to the first conventional embodiment shown in FIGS. 12(A) and 12(B) and the second conventional embodiment shown in FIG. 13, an advancement preventing stopper 141 comprising a piston rod of a pneumatic cylinder is formed in the front portion of the mold placing stand 106 so as to be able to be opposed to the mold advancement preventing stopped portion 119 from front side and so that the opposition can be cancelled.

In the above-mentioned basic construction, a portion for positioning the mold 113 and the plates 114 brought onto the mold placing stand 106 from the carriage has a following construction in each conventional embodiment.

(First Conventional Embodiment) Refer to FIGS. 12(A) and 12(B).

In the case of the mold 113 having a standard length, as shown in FIG. 12(A), the mold plate 114 is adapted to be directly stopped by means of a retraction preventing block 157 disposed in a rear portion of the mold placing stand 106 so as to position the driven portion 118 at a predetermined distance M from the block 157. On the other hand, in the case of the mold 113 having a shorter length than the standard length, as shown in FIG. 12(B), the driven portion 118 is positioned at the predetermined distance M from the block 157 by fixing a spacer 158 to the rear portion of the mold plate 114 by means of bolts 159.

(Second Conventional Embodiment) Refer to FIG. 13.

Instead of the aforementioned spacer 158, a pneumatic air cylinder 160 is provided in the rear portion of the mold placing stand 106, so that the mold plate 114 can be stopped by means of a piston rod 161 previously extended so as to position the driven portion 118 at the aforementioned predetermined distance.

(Third Conventional Embodiment) Refer to FIG. 14.

A pneumatic cylinder 163 is disposed in a middle portion of the mold placing stand 106 in the fore and back direction with its piston rod 164 engaged with an engagement groove 114b formed in a middle portion of the mold plate 114, and the driven portion 118 is fixedly secured to the front portion of the mold plate 114 through a spacer 165, so that the driven portion 118 can be positioned at the aforementioned predetermined distance.

There are, however, following problems associated with each above-mentioned conventional embodiment.

(First Conventional Embodiment) Refer to FIGS. 12(A) and 12(B).

Since the spacer 158 projects from the mold plate 114, the spacer 158 is apt to become an obstruction against a molding operation of the injection molding machine and the like.

(Second Conventional Embodiment) Refer to FIG. 13.

Since the pneumatic cylinder 160 projects from the mold placing stand 106, the stand 106 becomes large in size. In addition thereto, since it is necessary to adjust an advancing distance of the piston rod 161 in accordance with a receiving timing of the mold plate 114 having different longitudinal lengths at the time of positioning of the mold plate 114, a control device of the apparatus for placing a mold becomes complicated in construction.

(Third Conventional Embodiment) Refer to FIG. 14.

Since a thickness of the spacer 165 can be made half in comparison with that of the first conventional embodiment shown in FIGS. 12(A) and 12(B), it becomes possible to solve by half the problems of the first conventional embodiment. But, since it is necessary to provide the pneumatic cylinder 163, the control device of the apparatus for placing the mold is complicated in construction similarly to that of the second conventional embodiment.

SUMMARY OF THE INVENTION

It is an object of the present invention to facilitate a molding operation. It is another object of the present invention to downsize a mold placing stand. It is further another object of the present invention to simplify a construction of a control device of an apparatus for placing a mold.

For accomplishing the above-mentioned objects, the present invention is directed to improving a construction of a portion for positioning a push/pull driven portion on the mold placing stand, as follows.

Incidentally, in the following description, one of the opposite sides of a mold placing stand facing a mold replacing carriage is defined as a front side and the other thereof is defined as a back side.

An advancement preventing first stopped portion is fixed to a mold plate in a forwardly facing manner. A mold placing stand is provided with a first stopper adapted to face the first stopped portion from front side and to cancel such a facing. Further, a mold retraction preventing second stopped portion is fixed to the mold plate below the lower surface of the mold and above a mold supporting surface. A retraction preventing second stopper is disposed on the stand so as to be able to face the second stopped portion from back side at substantially the same height position as that of the second stopped portion.

The invention functions as follows.

When the mold and the mold plate are moved from the mold replacing carriage to the mold placing stand, the advancement preventing first stopper has been retracted from a mold passing space (for example, it has been retracted below the mold supporting surface) so as not to obstruct passings of these mold and mold plates. Under this condition, the push/pull hook engaged with the push/pull driven portion is advanced toward the stand.

By stopping an advancement of the hook when the mold plate has reached a predetermined position on the stand, the retraction preventing second stopper is opposed to the retraction preventing second stopped portion of the mold plate from back side and the advancement preventing first stopper is opposed to the advancement preventing first stopped portion from front side (for example, it is opposed thereto under such a condition as projecting above the mold supporting surface). Thereby, a forward and backward movement of the mold plate is prevented by means of the two stoppers so that the push/pull driven portion can be positioned accurately on the mold placing stand. After that, by disengaging the hook and the driven portion, the hook is returned to a predetermined position on the carriage.

As mentioned above, since the driven portion of the mold plate has been positioned accurately on the mold placing stand, it becomes possible to readily engage the hook with the driven portion when next time the mold plate and the mold will be taken out from the mold placing stand onto the carriage.

Since the present invention is constructed and functions as mentioned above, the following advantages can be obtained.

When the push/pull driven portion is positioned at a predetermined position on the mold placing stand, it is not necessary to project the spacer from the mold plate differently from the first conventional embodiment (refer to FIGS. 12(A) and 12(B)) and the third conventional embodiment (refer to FIG. 14). Therefore, it becomes possible to prevent an obstruction of the mold plate against the molding operation by the injection molding machine and the like so as to facilitate the molding operation.

Since it is possible to omit positioning cylinders of the second conventional embodiment (refer to FIG. 13) and the third conventional embodiment (refer to FIG. 14) by providing the retraction preventing second stopped portion in the mold plate and providing the retraction preventing second stopper in the mold placing stand, it is possible to make the mold placing stand small in size and to simplify the construction of the control device.

Since it is possible to omit positioning cylinders of the second conventional embodiment (refer to FIG. 13) and the third conventional embodiment (refer to FIG. 14) by providing the retraction preventing second stopped portion in the mold plate and providing the retraction preventing second stopper in the mold placing stand, it is possible to make the mold placing stand small in size and to simplify the construction of the control device.

BRIEF DESCRIPTION OF THE DRAWINGS

The invention is further described by way of illustrative example with reference to the annexed drawings, in which:

FIG. 1 is a sectional view taken along section line I—I in FIG. 3;

FIG. 2 is a plan view of a mold replacing system employing an apparatus for placing a mold;

FIG. 3 is a plan view showing a mold replacing carriage and the apparatus for placing the mold;

FIG. 4 is a front view of the apparatus for placing the mold and a view taken along directed line IV—IV in FIG. 3;

FIG. 5 is an enlarged view of a principal portion of FIG. 3;

FIG. 6 is a view taken along directed line VI—VI in FIG. 5;

FIG. 7 is a sectional view taken along section line VII—VII in FIG. 1;

DESCRIPTION OF THE PREFERRED EMBODIMENTS

Figure 1:
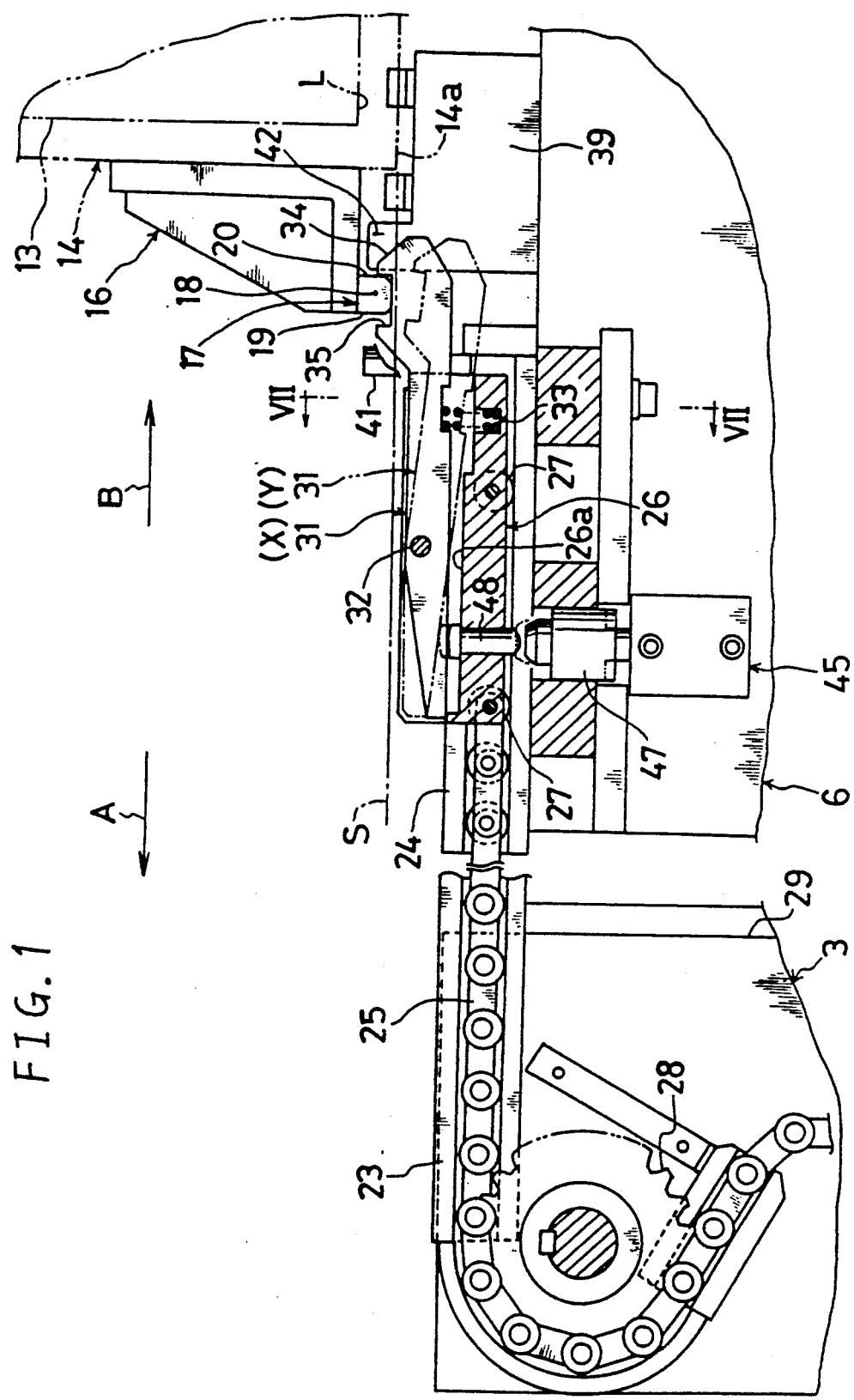
FIGS. 1 through 7 shows one embodiment of the present invention.

One embodiment of the present invention will be explained with reference to FIGS. 1 through 7 hereinafter.

Firstly, an overall construction of a mold replacing system will be explained with reference to a plan view of FIG. 2.

Carriage rails 2 are arranged between four different type injection molding machines 1a, 1b, 1c, 1d, and a mold replacing carriage 3 (referred to merely as a carriage hereinafter) provided with two left and right mold supporting surfaces 4, 5 is adapted to run along the rails 2 in the left and right direction. A plurality of mold placing stands 6 are installed on the back side B of the right end portion of the rails 2. Each mold placing stand 6 is provided with two left and right mold supporting surfaces S, S.

A replacement of a past used mold (not illustrated herein) of, for example the injection molding machine 1a is carried out according to the following procedure. Firstly, the carriage 3 is moved along the rails 2 to the front side A of the mold placing stand 6, and a new mold (not illustrated herein) placed on the mold supporting surface S of the stand 6 is brought to the left mold supporting surface 4 of the carriage 3. As illustrated, the carriage 3 is moved to the front side A of the injection molding machine 1a and then the past used mold is brought to the right mold supporting surface 5. Then, the carriage 3 is moved rightwards by a predetermined distance, so that the new mold on the left mold supporting surface 4 is brought out into the injection molding machine 1a. After that, the carriage 3 is moved to the front side A of the stand 6 and the past used mold on the right mold supporting surface 5 is returned onto the supporting surface S of the stand 6.

Constructions of the carriage 3 and the mold placing stand 6 will be explained with reference to FIG. 1 and FIGS. 3 through 7.

Figure 3:
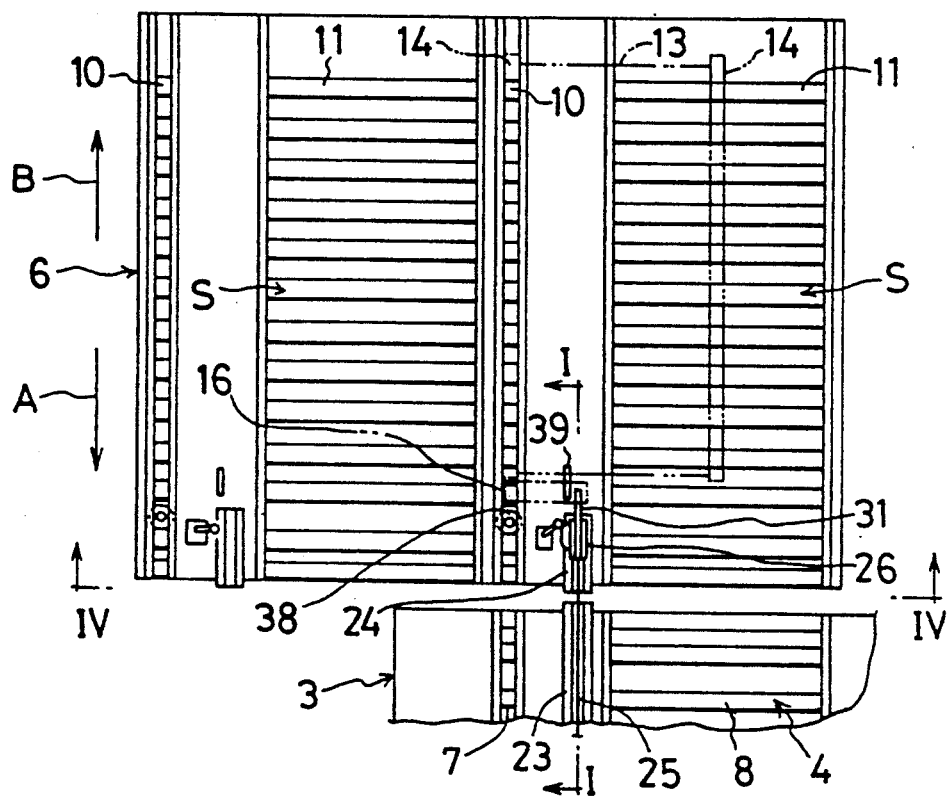
Figure 4:
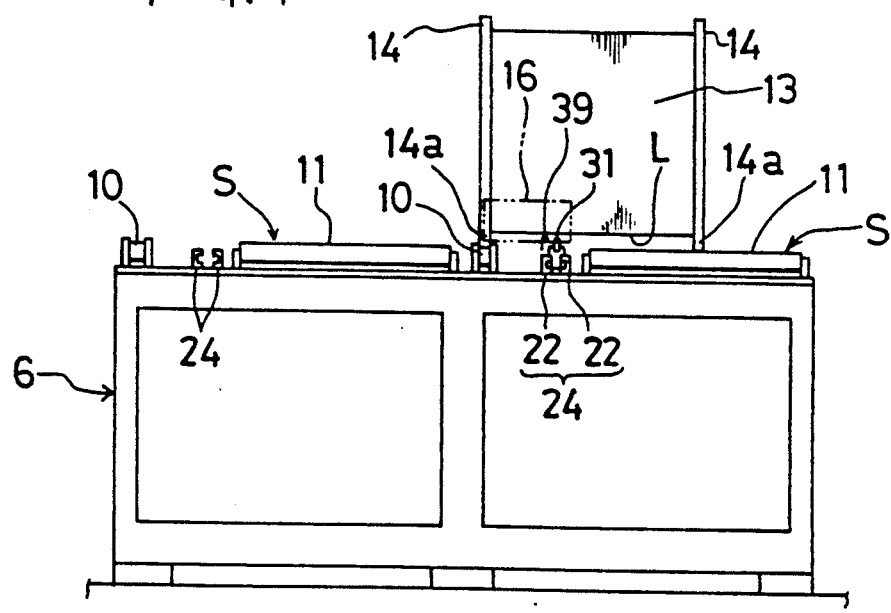

As shown in a plan view of FIG. 3 and a front view of FIG. 4, the left mold supporting surface 4 (and the right mold supporting surface 5) of the carriage 3 comprises a group of short rollers 7 on the left side and a group of long rollers 8 extending in the fore and back direction (in the direction of arrows A-B. The same shall apply hereinafter.). Also each mold supporting surface S of the stand 6 comprises a group of short rollers 10 on the left side and a group of long rollers 11 extending in the fore and back direction. Mold plates 14, 14 are fixedly secured to both the left and the right sides of a mold 13 with their downward projecting portions 14a, 14a mounted on the mold supporting surface S so as to be movable in the fore and back direction.

Figure 5:
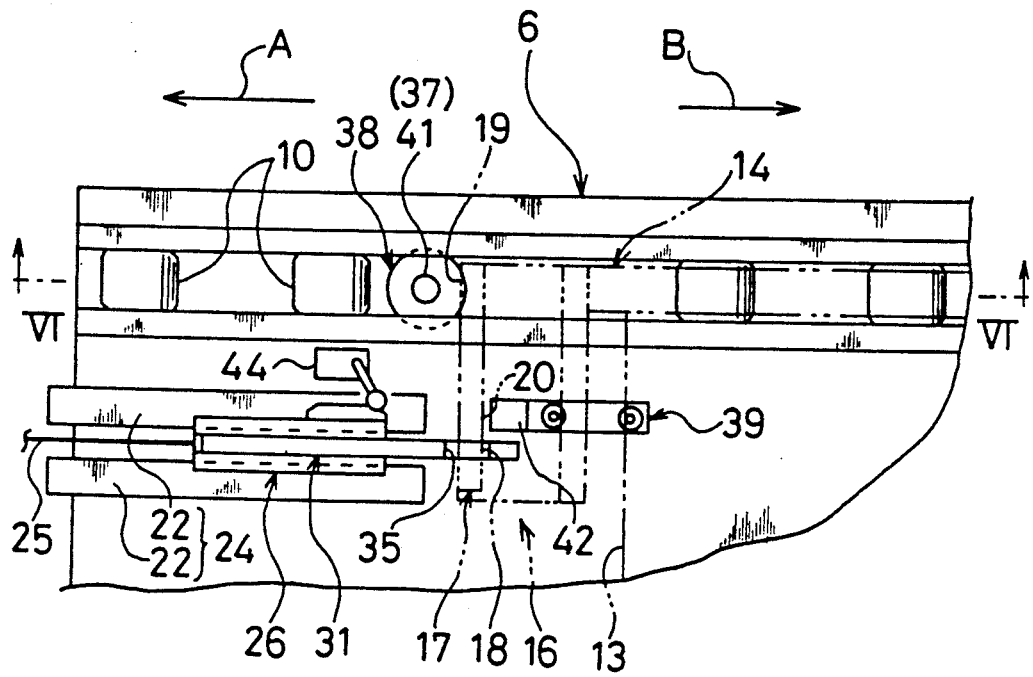
Figure 6:
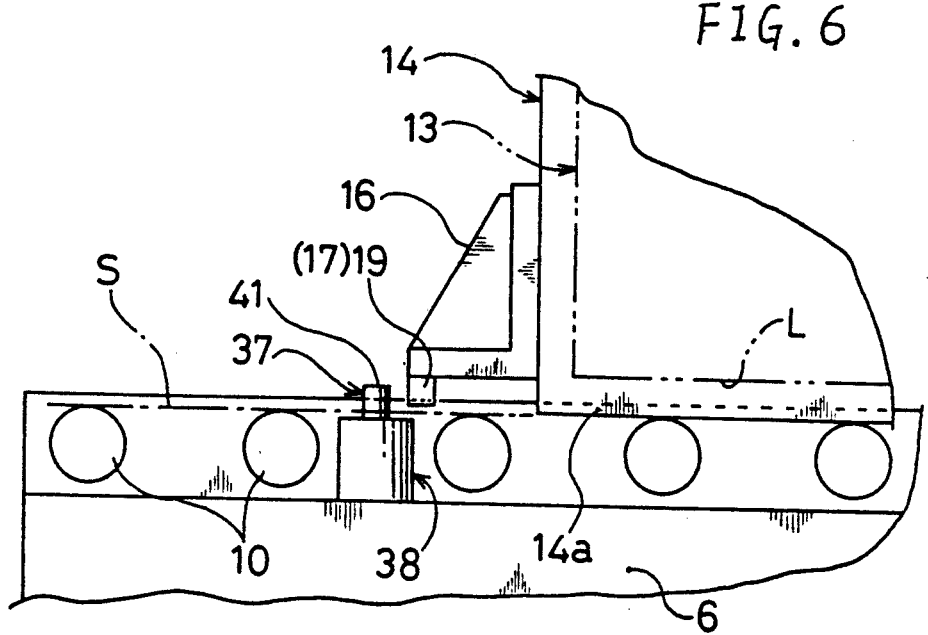
Figure 7:
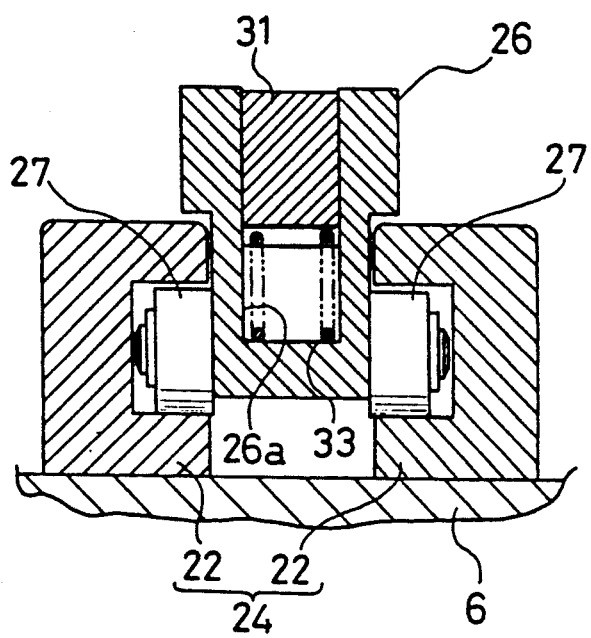

As shown in FIG. 1 and FIGS. 5 and 6, a L-shaped bracket 16 is fixedly secured to the front portion of the mold plate 14 on the left side. A laterally long operated member 17 fixed to the front lower portion of the bracket 16 comprises a mold push/pull driven portion (referred to as a driven portion hereinafter) 18, a mold advancement preventing stopped portion (referred to as a first stopped portion hereinafter) 19 and a mold retraction preventing stopped portion (referred to as a second stopped portion hereinafter) 20. The lower end surface of the operated member 17 is positioned below the lower surface L of the mold 13 and above the mold supporting surface S.

Guide rails 23, 24 comprising two rail members 22 having a C-shaped cross section facing to each other are fixedly secured to each upper portion of the carriage 3 and the mold placing stand 6 respectively. A push/pull carriage 26 is engaged with those guide rails 23, 24 through front and back rollers 27, 27 so as to be pushed and pulled by means of a chain 25 in the fore and back direction, and the chain 25 is adapted to be driven by means of a sprocket 28 disposed within the upper portion of the carriage 3 on the front side A. Incidentally, the sprocket 28 is adapted to be rotated by means of an unillustrated motor. Further, a portion of the chain 25 on the front side A is adapted to be folded so as to be stored within an accommodation box 29 of the carriage 3.

A push/pull hook 31 inserted into a receiving groove 26a of the push/pull carriage 26 is supported vertically swingably by means of a pivot pin 32 and resiliently urged to an upper engaged position X (refer to a solid line FIG. 1) by means of a spring 33. In a leading end portion of the push/pull hook 31 a forwardly declining cam surface 34 and an engagement groove 35 adapted to be engaged with the driven portion 18 of the mold plate 14 are provided in order from the leading end.

A pneumatic cylinder 38 whose piston rod 37 reciprocates vertically and a mold retraction preventing block 39 are installed to a portion of the mold placing stand 6 on the front side A. An advancement preventing stopper (referred to as a first stopper hereinafter) 41 provided in the upper portion of the piston rod 37 is adapted to face the first stopped portion 19 from the front side A. Further, a retraction preventing stopper 42 (referred to as a second stopper hereinafter) provided in the upper portion of the block 39 is so disposed as to face the second stopped portion 20 from the back side B. The upper surface of the second stopper 42 is disposed at a height between the lower end surface of the second stopped portion 20 and the lower surface L of the mold 13.

Procedures for taking in and out the mold 13 between the carriage 3 and the mold placing stand 6 will be explained mainly with reference to FIG. 1.

Under such a condition as keeping the mold 13 on the mold supporting surface S of the stand 6, the movement of the mold plate 14 toward the back side B is prevented by the second stopper 42 of the block 39 and the movement of the mold plate 14 toward the front side A is prevented by the first stopper 41 when the pneumatic cylinder 38 is extended. Thereby, the mold 13 and the mold plate 14 are located accurately at the predetermined position in the fore and back direction. Further, the push/pull carriage 26 is retracted to the front side A of the carriage 3.

When the mold 13 is moved from the stand 6 to the carriage 3, the sprocket 28 is rotated clockwise by means of a motor (not illustrated) so that the push/pull carriage 26 on the carriage 3 can be advanced to the back side B. As the push/pull carriage 26 is advanced, firstly the cam surface 34 of the push/pull hook 31 is brought into contact with the lower surface of the driven portion 18 of the mold plate 14 and then the leading end portion of the hook 31 is swung downwardly against the spring 33 by means of a downward reaction force acting on the cam surface 34 from the driven portion 18.

Subsequently, when the engaging groove 35 of the hook 31 approaches the position of the drive portion 18 together with the advancement of the push/pull carriage 26, the leading end portion of the hook 31 is swung upwardly by means of a resilient force of the spring 33 so that the engaging groove 35 can engage with the driven portion 18. Incidentally, just before the engaging groove 35 of the hook 31 is advanced to the position for engaging with the driven portion 18 as mentioned above, the limit switch 44 shown in FIG. 5 is adapted to detect the position of the advanced push/pull carriage 26 so as to stop the revolution of the motor (not illustrated) for stopping the push/pull carriage 26 and also to contract the pneumatic cylinder 38 for retracting the first stopper 41 below the lower end surface of the first stopped portion 19. By moving the push/pull carriage 26 to the front side A under that engaged condition, the mold 13 is pulled out onto the carriage 3.

To the contrary, the operation for moving the mold 13 from the carriage 3 to the stand 6 is carried out according to the following procedures.

Firstly, the mold plate 14 on the carriage 3 is advanced to the back side B by means of the push/pull carriage 26 and the first stopper 41 is retracted by the contraction of the pneumatic cylinder 38. As the push/pull carriage 26 is advanced from the side of the carriage 3 to the side of the mold placing stand 6, the limit switch 44 detects its advanced position so as to stop the push/pull carriage 26 at the hook engaging position and to extend the pneumatic cylinder 38 for preventing the advancement of the mold plate 14. Thereby, the forward and backward movement of the mold plate 14 is prevented by means of two stoppers 41, 42 so as to be positioned accurately on the stand 6.

Under the aforementioned condition, an actuator 45 (refer to FIG. 1) fixed to the stand 6 is so extended as to raise a pushing pin 48 of the push/pull carriage 26 by means of a pushing member 47. Thereupon, as shown by the alternate long and two short dashes line figure in FIG. 1, the leading end portion of the hook 31 swings downwardly so as to be changed over to a disengagement position Y located lower than the lower end surface of the driven portion 18. Under this condition, the sprocket 28 is rotated counterclockwise. Thereupon, the push/pull carriage 26 is pulled to the front side A by means of the chain 25, so that an engagement between the engaging groove 35 and the driven portion 18 is disengaged. Subsequently, the push/pull carriage 26 is moved to the predetermined position on the carriage 3.

Accordingly, the following advantages can be obtained by the above-mentioned construction.

Since the first stopped portion 19 and the second stopped portion 20 are arranged in a middle portion between a pair of side surfaces of the mold 13, a moment acting from the mold 13 to each stopper 41 or 42 becomes so small at the time of stopping the mold 13 by means of each stopper 41 or 42 that these stopper 41, 42 doesn't damage.

Since the hook 31 is adapted to engage with and disengage from the downwardly projected driven portion 18 from below, damages of the hook 31 and the push/pull carriage 26 can be prevented because the hook 31 can be swung downwardly even when something such as a metal mold collides against the hook 31 on the carriage 3 from above.

Further, since the driven portion 18, the first stopped portion 19 and the second stopped portion 20 are provided in only one operated member 17, the arrangement of these members becomes simpler.

Furthermore, since the second stopper 42 is fixedly mounted to the block 39 fixedly secured to the stand 6, also a construction for mounting the second stopper 42 becomes simpler.

Incidentally, the chain 25 may be drivable for pushing/pulling and be foldable and storable, and may be replaced by a belt and a wire.

Further, the mold supporting surface S of the mold replacing stand 6 may have one surface or at least three surfaces.

FIGS. 8 through 11 show a first through fourth variants. In each variant, a member having the same function as that in the above-mentioned embodiment is designated, in principle, by the same symbol.

Figure 8:
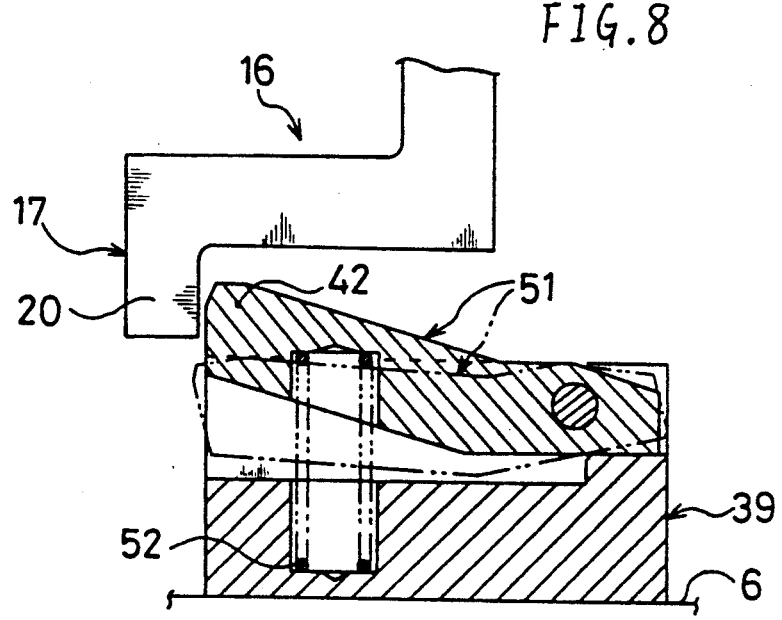
FIG. 8 shows a first variant of the present invention and a partial view corresponding to FIG. 1.

In a first variant shown in FIG. 8, an arm 51 vertically pivotally supported by the retraction preventing block 39 is resiliently urged by means of a spring 52 to the stop position depicted by the solid line, and the second stopper 42 is provided in the upper swingable end of the arm 51. According to this construction, even though the operated member 17 of the bracket 16 collides against the second stopper 42 due to an operational mistake of a crane or a forklift when the mold is placed onto the stand 6 by means of those crane and forklift, a damage of the second stopper 42 can be prevented because the arm 51 is changed over to the retraction position depicted by the alternate long and two short dashes line.

Figure 9:
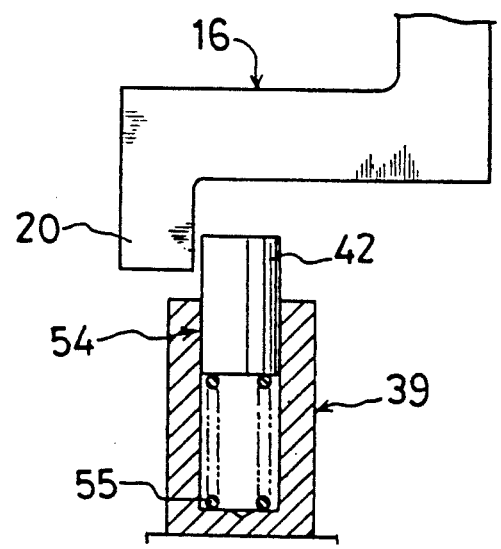
FIG. 9 shows a second variant of the present invention and is a view corresponding to FIG. 8.

According to a second variant shown in FIG. 9, the cylindrical retraction preventing block 39 is provided with a pin 54 resiliently urged to an upper stop position by means of a spring 55, and the second stopper 42 is provided in the upper portion of the pin 54.

Figure 10:
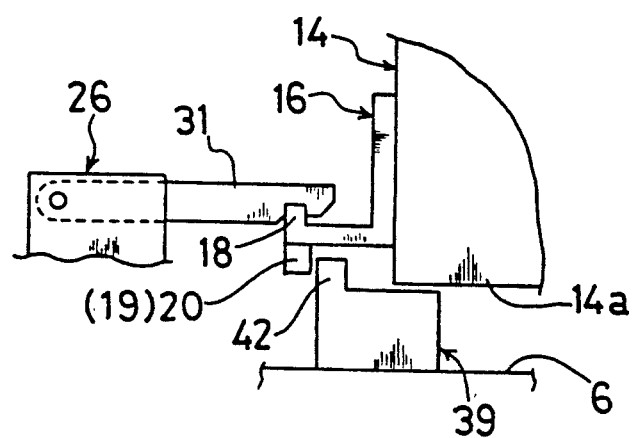
FIG. 10 shows a third variant of the present invention and is a view corresponding to FIG. 8.

According to a third variant shown in FIG. 10, the bracket 16 of the mold plate 14 is provided with the driven portion 18 facing upwardly and the first and second stopped portion 19, 20 facing downwardly. The push/pull hook 31 of the push/pull carriage 26 is adapted to be engaged with the driven portion 18 from above.

Figure 11:
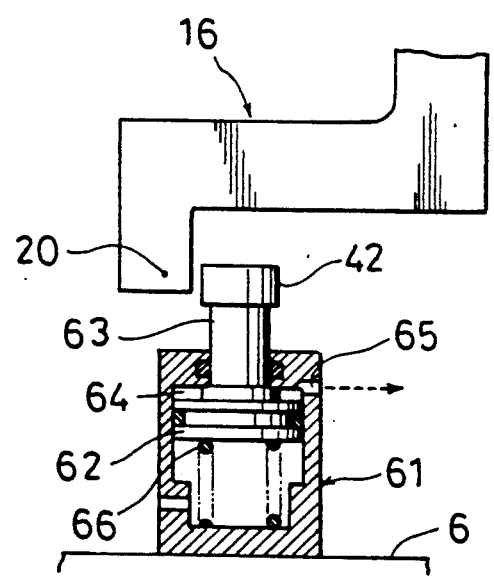
FIG. 11 shows a fourth variant of the present invention and is a view corresponding to FIG. 8.
Figure 12A:
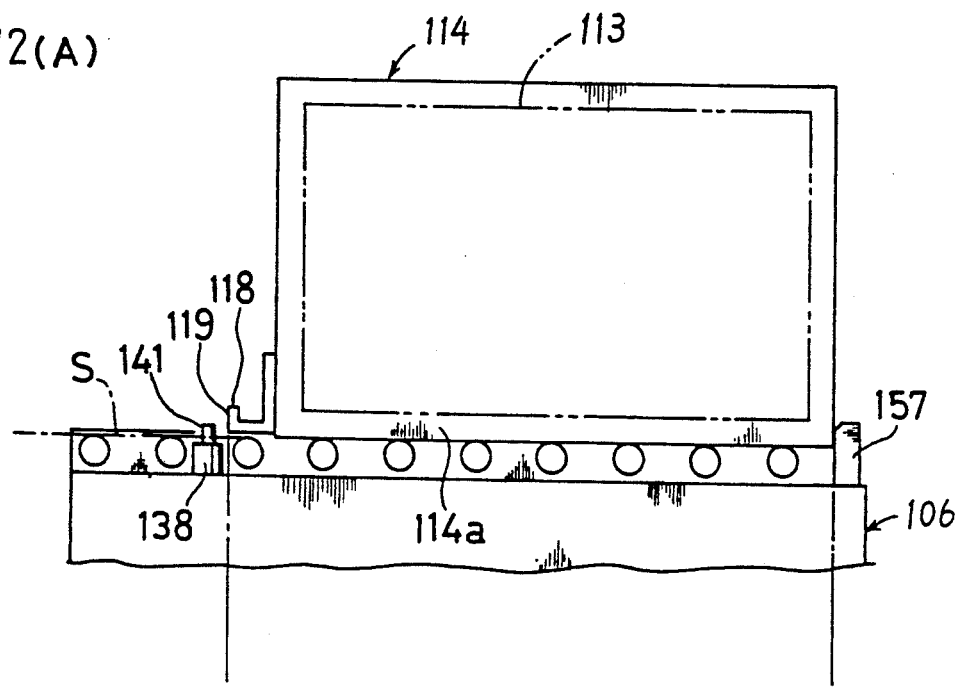
FIGS. 12(A) and 12(B) show a first conventional embodiment and is a view corresponding to FIG. 1.
Figure 12B:
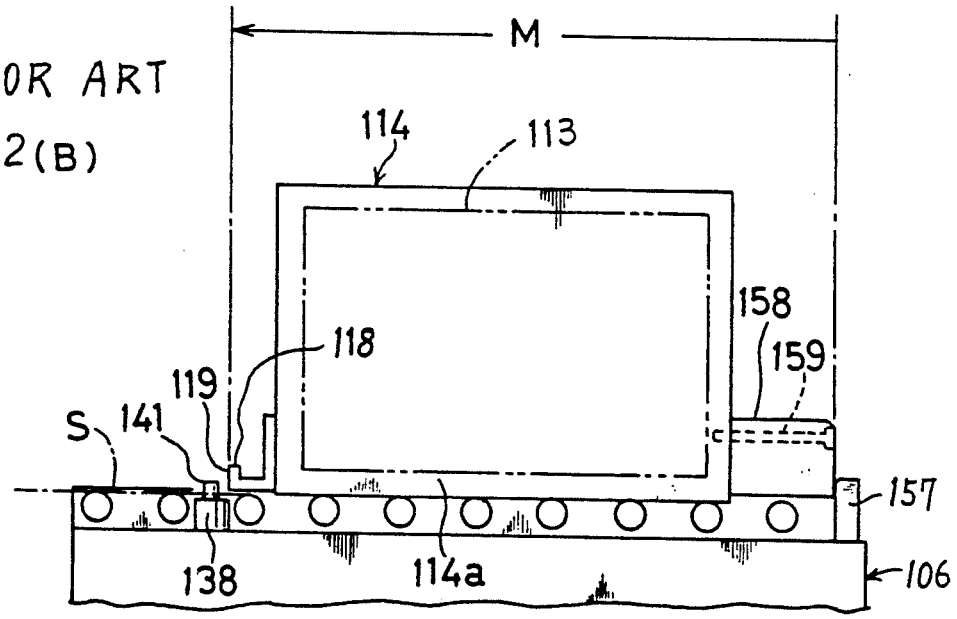
Figure 13:
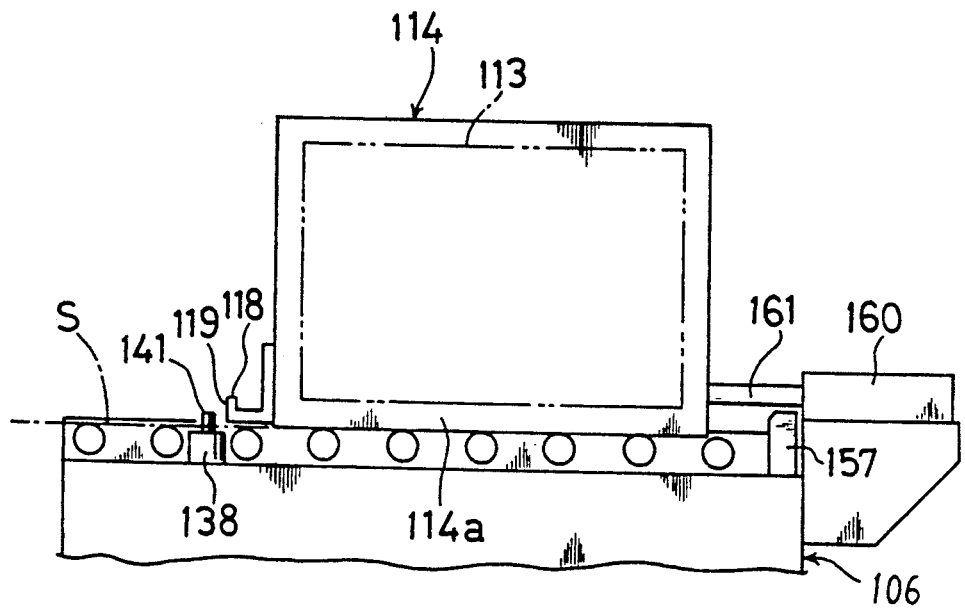
FIG. 13 shows a second conventional embodiment and is a view corresponding to FIG. 12(B) and FIG. 14 shows a third conventional embodiment and is a view corresponding to FIG. 12(B).
Figure 14:
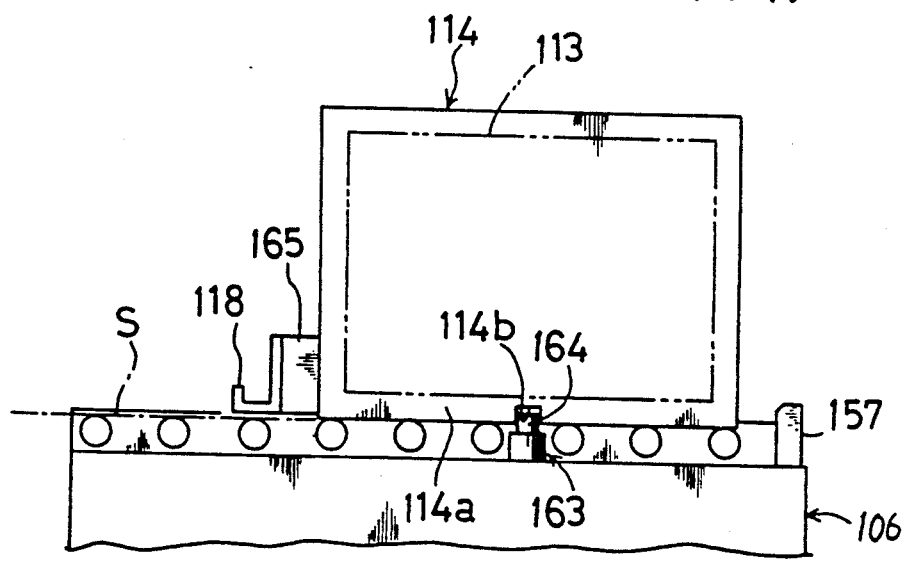

FIG. 11 shows a fourth embodiment.

The symbol 61 designates a single-acting spring-returning pneumatic cylinder. A piston 62 is inserted vertically movably into a cylinder 61 fixedly secured to the mold placing stand 6. The aforementioned second stopper 42 is disposed in an upper end of a piston rod 63 projected upwardly from the piston 62. As illustrated, when the pressurized air within an actuation chamber 64 is discharged from an air supply/discharge port 65, the piston 62 is raised by means of a spring 66 and the second stopper 42 comes to face the retraction preventing stopped portion 20 fixed to the bracket 16, from back side. To the contrary, when the pressurized air is supplied from the air supply/discharge port 65 to the chamber 64, the piston 62 is lowered against the spring 66 so that the facing between the second stopper 42 and the second stopped portion 20 can be cancelled. Thereby, the bracket 16, the mold and the mold plate (all of them are not illustrated) become movable also to the back side (to the right side in FIG. 11).

When the above-mentioned construction shown in FIG. 11 is applied to the following apparatus, the following advantages can be provided.

Figure 2:
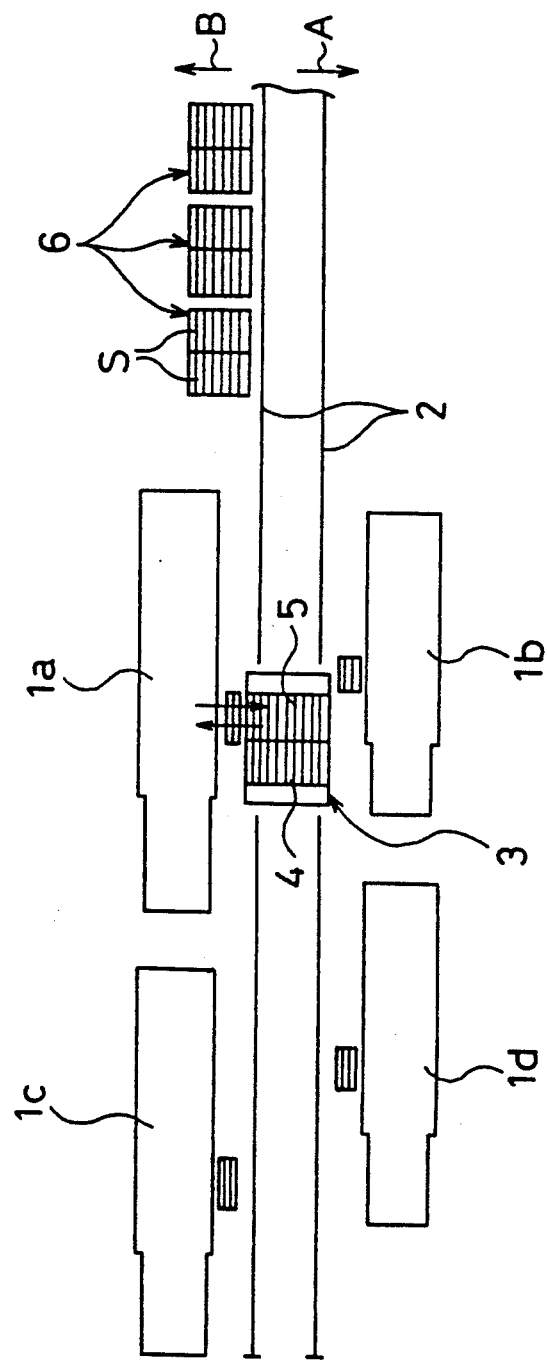

As shown in FIG. 2, the rails 2, 2 and the carriage 3 are arranged on the front side A of the plurality of mold placing stands 6. In addition thereto, other rails and another carriage are arranged also on the back side B of those stands 6. Then, by driving the mold placed on the stand 6, toward the back side B by means of the hook, it becomes possible to move the mold also onto the carriage on the back side. Therefore, since these stands can be utilized in common by the plurality of carriages, the installation space can be made smaller and the manufacturing cost can be reduced.

Incidentally, instead of the arrangement of other rails and another carriage as mentioned above, a hand-push carriage and a stationary temporally-placing stand may be arranged on the back side B of the stand 6. In the case of the latter temporally-placing stand, the movement of the mold brought onto the stand is carried out by means of a ceiling crane or a forklift.

Further, the first stopper 41 and the second stopper 42 may be projected laterally from the the guide rail 24 of the stand 6 or a receiving plate for the roller 10 and the like instead that they are upwardly projected from the stand 6 as shown in the above-mentioned embodiments and variants.

Furthermore, the aforementioned driven portion 18, first stopped portion 19 and second stopped portion 20 may comprise separate members respectively.

As many different embodiments of the present invention will be obvious to those skilled in the art, some of which have been disclosed or referred to herein, hence it is to be understood that the specific embodiments of the invention as presented herein are intended to be by way of illustration only and are not limiting on the invention, and it is to be further understood that such embodiments, changes or modifications may be made without departing from the spirit and scope of the invention as set forth in the claims appended hereto.

What is claimed is:

1. An apparatus for placing a mold, which apparatus comprising:
   a mold placing stand (6) having a first end facing a mold replacing carriage (3) and a second end on an opposed side and provided with a mold supporting surface (S) extending in the direction of those opposite ends;
   a mold (13) having a pair of side surfaces and a lower surface (L);
   a pair of mold plates (14)(14) having downwardly projecting portions (14a)(14a) adapted to be placed on said mold placing surface (S), said mold plates (14)(14) being fixedly secured to said paired side surfaces of the mold (13);
   a driven portion (18) fixedly secured to said mold plate (14) and adapted to be moved by way of a hook (31) provided in said carriage (3) in said direction of the opposite ends;
   a first stopped portion (19) fixedly secured to one of said mold plates (14) so as to face said first end side;
   a second stopped portion (20) fixedly secured to one of said mold plates (14) so as to face said second end side at a position below the lower surface (L) of said mold (13) and above said mold supporting surface (S);
   a first stopper (41) provided in said stand (6) so as to be able to face and cancel the facing relative to said first stopped portion (19) from the first end side; and
   a second stopper (42) provided in said stand (6) so as to be able to face said second stopped portion (20) from the second end side at substantially the same height position as that of said second stopped portion (20).

2. An apparatus as defined in claim 1, wherein
said first stopped portion (19) and said second stopped portion (20) are disposed between said paired side surfaces of said mold (13), and
said first stopper (41) is adapted to be advanced and retracted vertically relative to said stand (6), and said second stopper (42) is projected upwardly from said stand (6).

3. An apparatus as defined in claim 2, wherein
said second stopper (42) is fixedly secured to a block (39) fixed to said stand (6).

4. An apparatus as defined in claim 2, wherein
said second stopper (42) can be advanced and retracted vertically relative to said stand (6).

5. An apparatus as defined in claim 2, wherein
said driven portion (18) is projected downwardly, and
said hook (31) is provided with an upwardly facing engaging groove (35) adapted to be engaged with said driven portion (18) and is swung vertically between an engaging position (X) on the upper side and a disengaging position (Y) on the lower side.

6. An apparatus as defined in claim 5, wherein
said driven portion (18), said first stopped portion (19) and said second stopped portion (20) are provided in only one operated member (17).

* * * * *